US005690409A

United States Patent [19]

Boebel

[11] Patent Number: 5,690,409

[45] Date of Patent: Nov. 25, 1997

[54] HEADLIGHT FOR VEHICLES

[75] Inventor: Doris Boebel, Stuttgart, Germany

[73] Assignee: Robert Bosch GmbH, Stuttgart, Germany

[21] Appl. No.: 586,068

[22] Filed: Jan. 16, 1996

[30] Foreign Application Priority Data

Mar. 10, 1995 [DE] Germany ........................ 195 08 639.2

[51] Int. Cl.⁶ ........................ B60Q 1/04

[52] U.S. Cl. ........................ 362/61; 362/255; 362/298

[58] Field of Search ........................ 362/255, 256, 362/297, 298, 346, 351, 61

[56] References Cited

U.S. PATENT DOCUMENTS 3,176,124 3/1965 Cibie ........................ 362/297

FOREIGN PATENT DOCUMENTS 0365193 9/1989 European Pat. Off. .

11 97 825 8/1965 Germany .

1597925 10/1970 Germany ........................ 362/255

*Primary Examiner*—Y My Quach

*Attorney, Agent, or Firm*—Michael J. Striker

[57] ABSTRACT

A headlight has a light source and a reflector. A screening device is associated with the light source and has a web located at both sides of the light source and extending along the optical axis. A light-impermeable cap forms a part of the screening device arranged under the light source. A gap-like opening remains between the upper edges and the lower edges of the webs. Above the web, light emitted by the light source and reflected from the upper region of the reflector can pass and form a low beam to produce an upper bright-dark limit by the upper edges of the webs. The light passing through the gap-like openings is reflected from the lower region of the reflector and forms an additional light beam arranged at a distance above the bright-dark limit.

6 Claims, 4 Drawing Sheets

HEADLIGHT FOR VEHICLES

BACKGROUND OF THE INVENTION

The present invention relates to a headlight for vehicles.

One of such headlights is disclosed for example in the European patent document EP 0 365 193 A1. The headlight has a light source, a reflector and a screening device associated with the light source. The screening device screens a part of the light emitted by the light source, so that it cannot exit the reflector. Also, an upper bright-dark limit of the light beam exiting the headlight is produced by the screening device. No or only little light exits above the bright-dark limit in this headlight, and therefore a blinding from the opposite traffic is avoided. For this reason, however the regions of the traffic situation before the vehicle, which are arranged at a distance above the bright-dark limit are not illuminated or illuminated only insufficiently. Therefore the vehicle driver does not recognize or recognize with difficulties the objects or obstacles located there, such as for example highly arranged traffic signs.

SUMMARY OF THE INVENTION

Accordingly, it is an object of the present invention to provide a headlight for vehicles of the above mentioned general type, which avoids the disadvantages of the prior art.

In keeping with these objects and with others which will become apparent hereinafter, one feature of the present invention resides, briefly stated, in a headlight for vehicles, in which the screening device at least at both sides of the optical axis has a light impermeable web extending along the optical axis of the reflector and also extending over part of the periphery of the light source, while between its upper edges an opening is provided through which the light emitted by the light source can pass and is reflected by the upper region of the reflector for forming a light beam, the bright-dark limit of the light beam is produced by the upper edges of the web, and between the upper edges of the web also at least one opening is provided through which the light emitted by the light source can pass and is reflected by a lower region of the reflector and forms an additional light bundle extending above the bright-dark limit.

When the headlight is designed in accordance with the present invention, it has the advantage that the light bundle exiting the reflector has an upper bright-dark limit and above it a not illuminated region, so that a blinding by the opposite vehicle drivers is avoided. However, due to the additional light beam, a region in front of the vehicle located above the bright-dark limit and therefore the traffic situation in this region is sufficiently illuminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
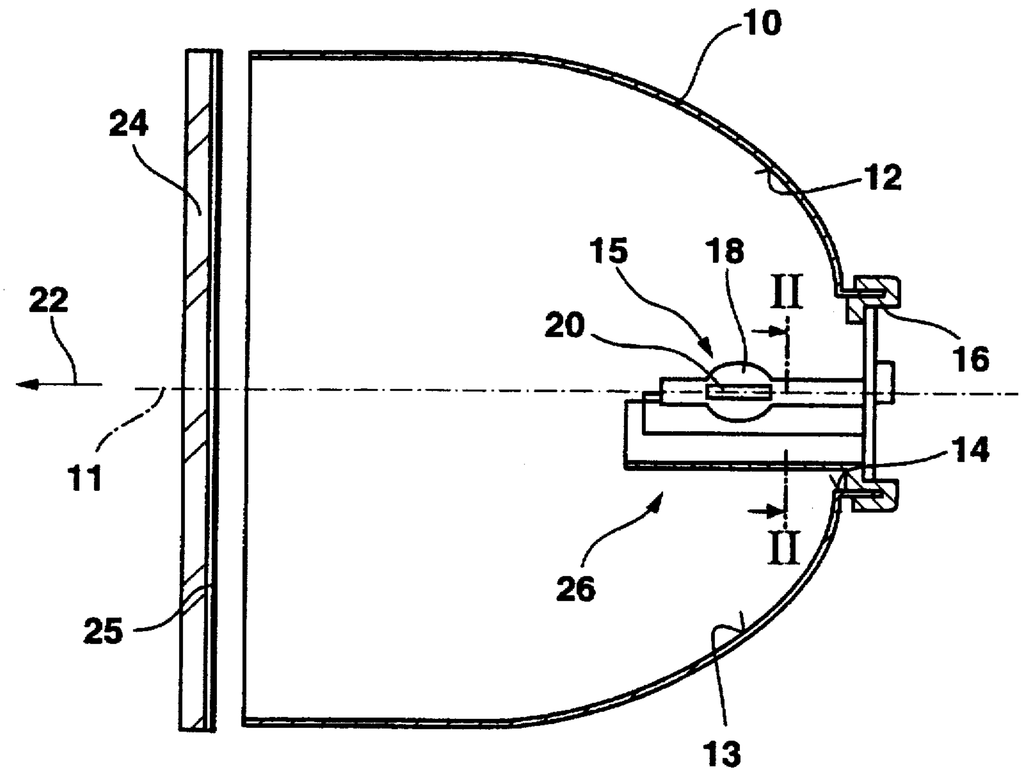
FIG. 1 is a view showing a headlight for a vehicle in accordance with the present invention with a screening device in a vertical longitudinal section.

A headlight for a vehicle shown in FIG. 1 has a reflector 10 with an optical axis 11. The reflector 10 has an upper region 12 and a lower region 13. The reflector 10 has an opening 14 provided in its apex region, and a light source 15 is inserted in the opening. The light source 15 can be an incandescent lamp or a gas discharge lamp and can be held in a lamp carrier 16 mounted on the reflector 10. The light source 15 extends with its glass bulb 18 into the reflector. The glass bulb 18 accommodates a light body 20 which can be either an incandescent spiral or a light arc formed during the operation of the light source 15. The form of the reflector 10 is determined so that the light emitted by the light source 15 is reflected by the reflector in a predetermined manner. A light permeable cover disc 24 is arranged after the reflector 10 as considered in a light outlet direction 22. It covers the light outlet opening of the headlight. The cover disc 24 can be smooth so that the light reflected by the reflector 10 is not influenced during passage through the cover disc 24. Alternatively, the cover disc 24 can be provided with optical elements 25 formed for example as lenses and/or prisms. Therefore, the light reflected by the reflector 10 is influenced during its passage through the cover disc 24, or in other words is deviated and/or dispersed.

Figure 2:
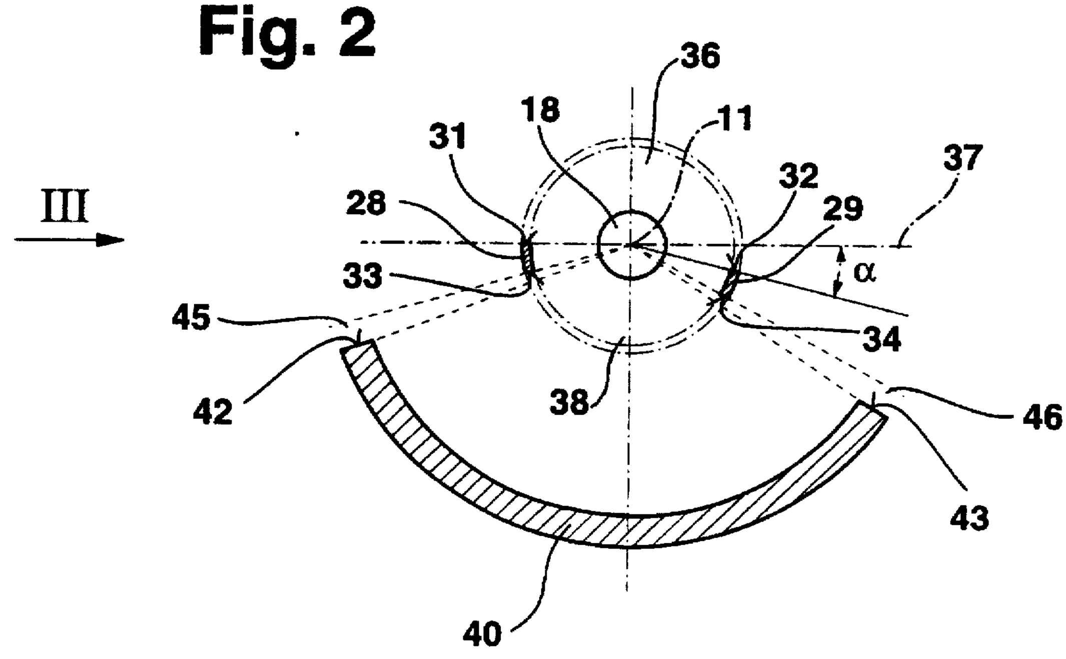
FIG. 2 is a view showing a headlight of FIG. 1 in a section taken along the line II—II with the screening device in accordance with a first embodiment of the present invention.
Figure 3:
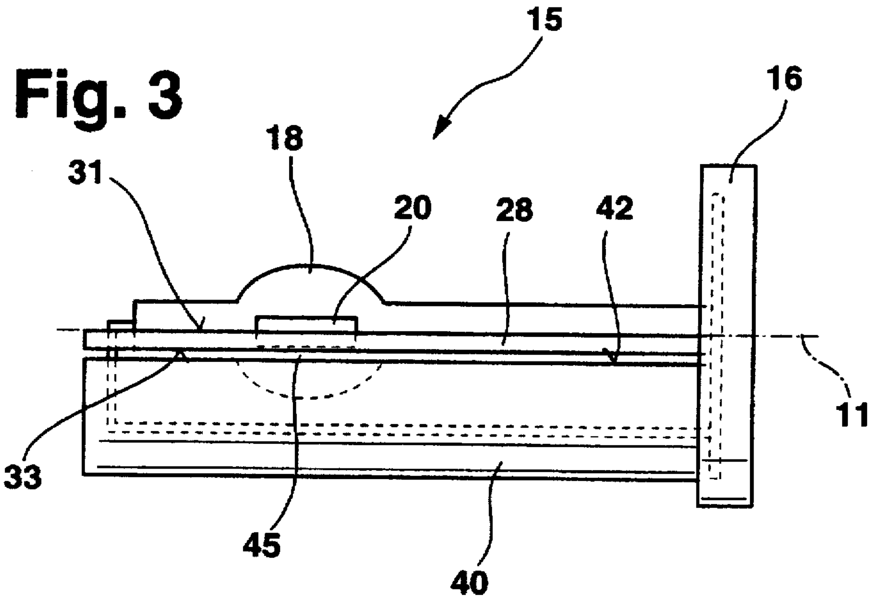
FIG. 3 is a side view of a light source and the screening device of FIG. 2 as seen in direction of the arrow III in FIG. 2.

The screening device 26 is associated with the light source 15. It screens a part of the light emitted by the light body 20 of the light source 14, so that it cannot exit the reflector 10. The screening device 26 in accordance with the first embodiment is shown in FIGS. 2 and 3. A screening device 26 has webs 28 and 29 which extend laterally near the glass bulb 18 of the light source 15 at both sides of the optical axis 11 and along the optical axis 11. The webs 28 and 29 are light-impermeable and arranged in the region of the light body 20 as considered in direction of the optical axis 11. The webs 28 and 29 are formed as separate components and arranged outside the glass bulb 18 of the light source 15. The webs 28 and 29 can be mounted on the lamp carrier 16 or can be also formed of one piece with the lamp carrier 16. Alternatively, the webs 28 and 29 can be also mounted on the reflector 10, for example in its apex region or also on a front edge facing in the light outlet direction 22.

The webs 28 and 29 extend over part of the periphery of the glass bulb 18 of the light source 15 and each have an upper edge 31 and 32 and a lower edge 33 and 34 correspondingly. An opening 36 remains between the upper edges 31 and 32 of the webs 28 and 29. The light emitted by the light body 20 and reflected from the upper region 12 of the reflector 10 can pass through the opening 36 and exit the headlight so as to form a low beam. The low beam has an upper bright-dark limit which is produced by the upper edges 31, 32 of the webs 28, 29. As considered in the light outlet direction 22, for example the left web 28 is arranged with its upper edge 31 substantially at the height of the optical axis 11 while the right web 29 is arranged with its upper edge 32 underneath the optical axis 11. The upper edge 32 of the right web 29 is for example arranged under an angle α of approximately 15° deeper with respect to a horizontal line 37 extending through the optical axis 11.

An opening 38 is formed between the lower edges 33 and 34 of the webs 28, 29. The light emitted by the light body 20 can pass through the opening 38. A light-impermeable cap 40 is arranged underneath the glass bulb 18 of the light source 15 as a further component of the screening device 26 and partially covers the opening 38. The cover 40 extends over part of the periphery of the opening 38 and has upper edges 42 and 43 adjoining the lower edges 33 and 34 of the webs 28, 29. Gap-like openings 45 and 46 are provided between the upper edges 42 and 43 of the cap 40 and the lower edges 33 and 34 of the webs 28, 29 correspondingly. The light emitted by the light body 20 and reflected by the lower region 13 of the reflector can pass through the gap-like opening 45 and 46 and form an additional light beam. The width of the openings 45 and 46 is substantially constant over its longitudinal extension along the optical axis 11. The width of the webs 28, 29, or in other words their extension over the periphery of the glass bulb 18 of the light source 15, is also substantially constant over the longitudinal extension along the optical axis 11. The extension of the openings 45, 46 of the peripheral light source 15 is smaller relative its longitudinal extension along the optical axis 11. The cap 40 is formed as a separate component outside of the glass bulb 18 of the light source 15. It can be connected with the light carrier 16 as the webs 28, 29, it can also formed of one piece with the same, or mounted in another way on the reflector 10. The webs 28, 29 and the cap 40 can be formed of one piece with one another.

Figure 6:
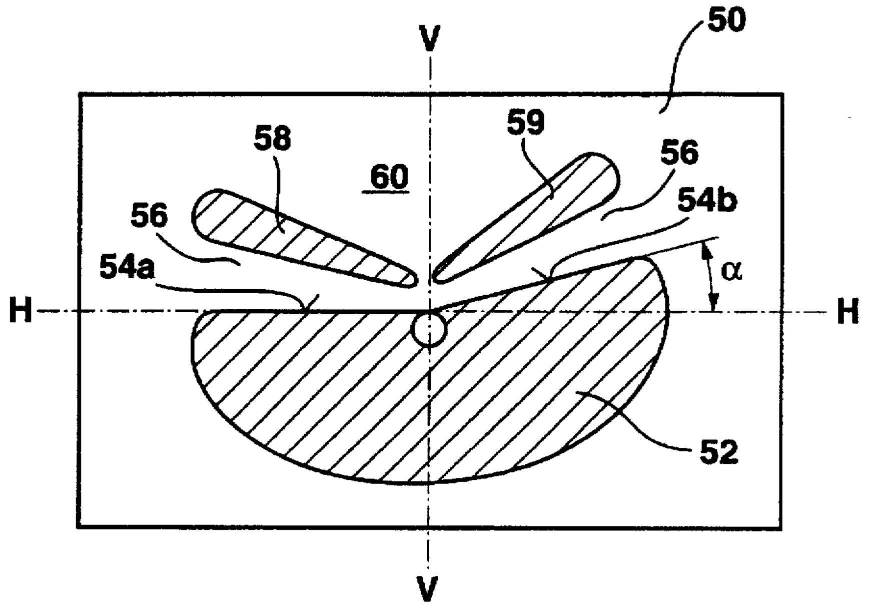
FIG. 6 is a view showing a measuring screen arranged in front of the headlight and illuminated by a light beam reflected by the reflector with the screening device in accordance with the first embodiment of the present invention.
Figure 7:
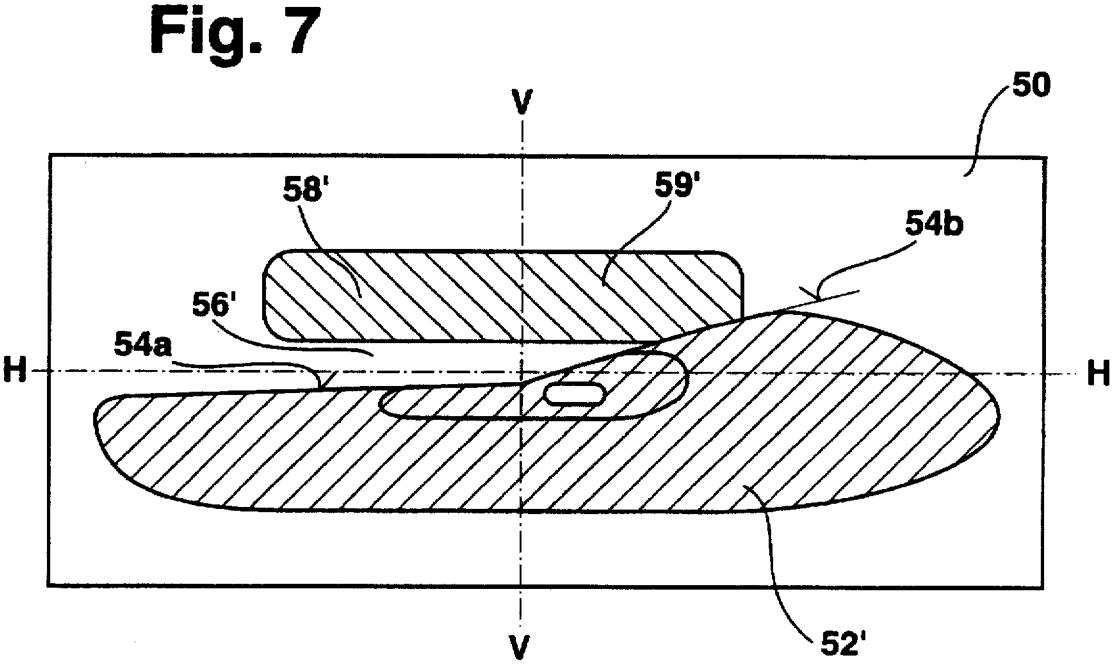
FIG. 7 is a view showing the measuring screen with the illumination by the light beam reflected by the reflector and passing through a cover disc.

FIGS. 6 and 7 show a measuring screen which is arranged at a distance in front of the headlight perpendicular to the optical axis 11 and presents a projection of a roadway arranged in front of the headlight. In FIG. 6 those regions of the measuring screen 50 are marked which are illuminated by the light beam reflected by the reflector 10, and the cover disc 24 is removed. The region of the measuring screen 50 identified with reference numeral 52 is illuminated by the low beam reflected from the upper region 12 of the reflector 10. The region 52 is limited from above by a bright-dark limit 54 produced by the upper edges 31 and 32 of the webs 28, 29. The bright-dark limit at the left side of the vertical central plane VV of the measuring screen 50 has a horizontally arranged portion 54a which is produced by the edge 31 of the web 28, at the right side of the vertical central plane VV it has a portion 54b which raises toward the right edge of the measuring screen 50 and is produced by the edge 32 of the web 29. The raising portion 54b of the bright-dark limit is inclined upwardly at an angle α relative to the horizontal portion 54a, with respect to the intersecting point HV of the vertical central plane VV and the horizontal central plane HH of the measuring screen 50. The angle α, under which the portion 54b of the bright-dark limit 54 is inclined, is equal to the angle α under which the upper edge 32 of the web 29 is inclined downwardly relative to the horizontal line 37.

Directly above the bright-dark limit 54, a region on the measuring screen 50 is not illuminated and its height is determined by the width of the webs 28, 29, or in other words how far the webs 28, 29 extend beyond the periphery of the light source 15. Above the region 56, further regions 58 and 59 are illuminated by the additional light beam which passes through the openings 45 and 46 between the webs 28, 29 and the cap 40 and is reflected by the lower region 13 of the reflector 10. The region 58 is arranged with a distance above the horizontal portion 54a of the bright-dark limit, while the region 59 is arranged with a distance above the inclined portion 54b of the bright-dark limit. The height of the regions 58, 59, or in other words their extension in the vertical direction, increases starting from the vertical central plane VV with an increasing distance from it. Above the regions 58, 59, a region 60 is not illuminated, since the light which illuminates the region 60 is blocked by the cap 40.

FIG. 7 shows the measuring screen 50 with the illumination by the light beam exiting the headlight with the cover disc 24 arranged in front of it. The cover disc 24 is provided with optical elements which disperse in the horizontal direction the light passing through it. A region illuminated with the measuring screen 50 by the low beam reflected from the upper region 12 of the reflector 10 is identified as 52', and the bright-dark limit is identified in FIG. 6 as 54a,b. The regions which are illuminated by the additional light beam reflected from the lower region 13 of the reflector 10 are identified as 58' and 59'. Under the action of the optical elements of the cover disc 24, they are expanded in the horizontal direction so that they partially superimpose over one another. Because of the illumination of the regions 58', 59' by the additional light bundle extending through the openings 45 and 46, the objects located in the regions 58', 59' are visible. On the other hand, because of the not illuminated regions 56' located between the regions 58', 59' and the bright-dark limit 54a,b, a blinding of the opposite traffic participant is avoided.

The above described embodiment of the screening device 26 is suitable for the use with the headlights of the vehicles with right traffic side. For the use in vehicles with left traffic side, the webs 28, 29 are arranged reversely. In other words, when considered in the light outlet direction 22, the right web 29 is arranged so that its upper edge 32 is located substantially at the height of the optical axis 11, while the left web 28 is arranged so that its upper edge 33 is arranged deeper under the angle α of substantially 15° with respect to the line extending through the optical axis 11.

Figure 4:
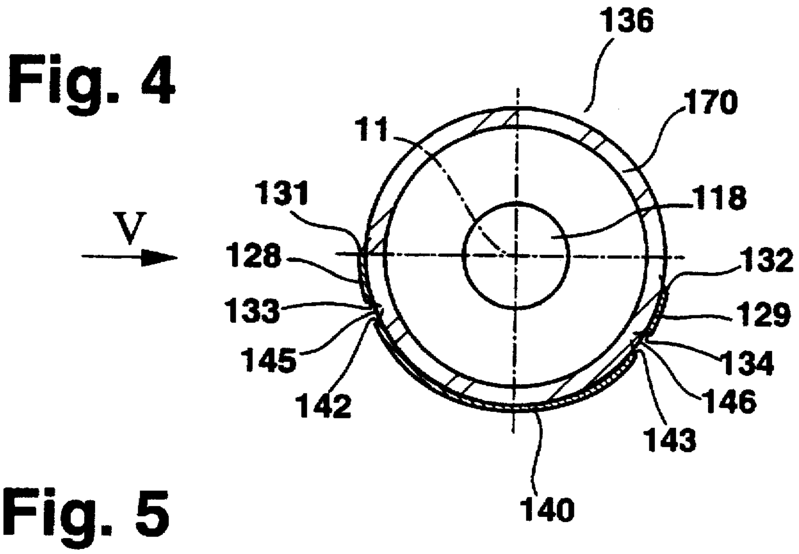
FIG. 4 is a view showing a headlight in a cross-section with the screening device in accordance with a second embodiment of the present invention.
Figure 5:
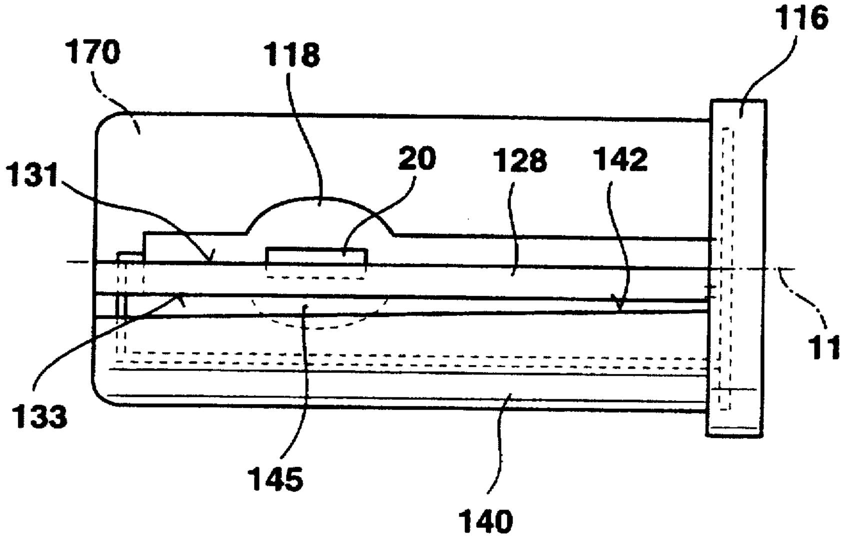
FIG. 5 is a view showing a light source and a screening device of FIG. 4 on a side view as seen in direction of the arrow V in FIG. 4.

FIGS. 4 and 5 show the screening device 126 in accordance with the second embodiment of the invention. The basic construction of the headlight of FIGS. 1–3 remains unchanged. A light permeable tube bulb 170 is associated with the light source 115 and surrounds the glass bulb 118 of the light source 115 extending in the reflector with the distance from it. The tube bulb 170 forms a casing for the light source 15 and is composed for example of glass, such as hard glass. The tube bulb 170 is held for example on the lamp carrier 116. Both webs 128, 129 are mounted on the tube bulb 170 as a part of the screen device 126 and form of a light impermeable coating. The webs 128, 129 extend correspondingly over part of the periphery of the tube bulb 170 and have upper edges 131, 132 and lower edges 133, 134. An opening 136 is provided between the upper edges 131, 132 of the webs 128, 129. The light emitted by the light body 20 of the light source 115 and reflected by the upper region 12 of the reflector 10 passes through the opening 136 and forms the low beam. A light-impermeable cap 140 is arranged between the lower edges 133, 134 of the webs 128, 129. It has upper edges 142, 143 which are arranged near the lower edges 133, 134 of the webs 128, 129 with a distance from them. The cap 140 is formed for example as a separate component inside or outside of the tube bulb 170. Alternatively, as shown in FIGS. 4 and 5, it can be formed as a light-impermeable coating applied on the tube bulb 170.

A gap shaped opening 145, 146 remains between the upper edges 142, 143 of the cap 140 and the lower edges 133, 134 of the webs 128, 129. The upper edges 131, 132 of the webs 128, 129 are arranged as in the first embodiment. The lower edges 133, 134 and/or upper edges 142, 143 of the cap 140 are arranged so that the width of the gap shaped openings 145, 146, or in other words, their extension over the periphery of the tube bulb 170 or the periphery of the light source 115, is changeable over their longitudinal extension along the optical axis 11. The width of the openings 145, 146 is smaller relative to their longitudinal extension along the optical axis 11. This width is selected so that the light emitted by the light body 20 from the lower region 13 of the reflector and passing through them forms an additional light beam which illuminates on the measuring screen of FIG. 8 the regions 158 and 159 with a distance above the bright-dark limit 154. The height of the regions 158, 159 is substantially constant over their horizontal extension.

Figure 8:
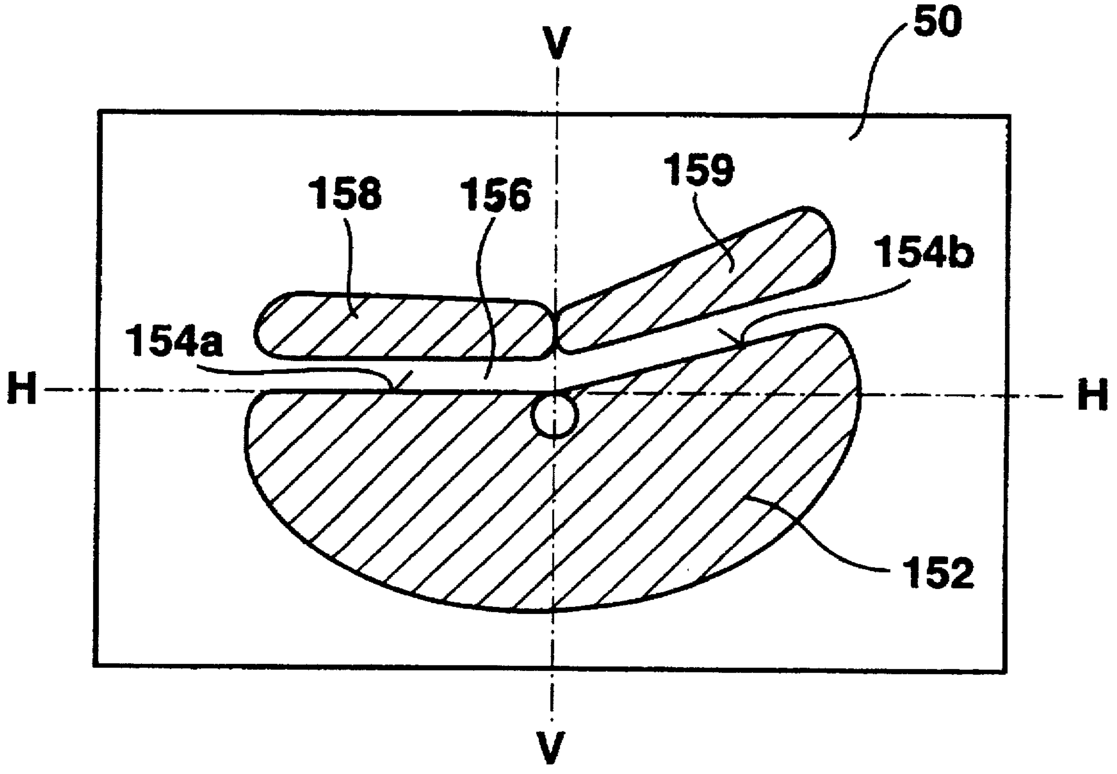
FIG. 8 is a view showing the measuring screen with the illumination by the light beam reflected by the reflector and with the screening device in accordance with the second embodiment of the present invention.

FIG. 8 shows the measuring screen 50 during the illumination by the low beam reflected from the upper region 12 of the reflector 10 and by the additional light beam reflected from the lower region 13 of the reflector 10, when the cover disc 20 is removed. The low beam illuminates on the measuring screen 50 the region 152 which is limited from above by the bright-dark limit 154*a*,*b*. The region 158 illuminated by the additional light beam extends at a distance above the horizontal portion 154*a* of the bright-dark limit substantially parallel to it, while the region 159 extends at a distance above the inclined portion 154*b* of the bright-dark limit substantially parallel to it. A not illuminated region 160 is located between the bright-dark limit 154*a*,*b* and the regions 158, 159. During the determination of the changeable widths of the openings 145, 146, also the projecting properties of the lower region 13 of the reflector 10 have to be considered, so that the additional light beam reflected from it illuminates on the measuring screen 50 the regions 158, 159 with a substantially constant height. The optical elements of the cover disc 20 disperse the additional light beam similarly to the first embodiment.

The above described cap 40 or 140 of the screening device 26 or 126 can be dispensed with when correspondingly the lower region 13 of the reflector 10 is formed so that the light passing downwardly between the webs 28, 29 or 128, 129 is reflected as a horizontally dispersed light beam with a small height and illuminates the above described regions 58, 59 or 158, 159 of the measuring screen 50.

While the invention has been illustrated and described as embodied in a headlight for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A headlight for vehicles, comprising a light source; a reflector; a screening device associated with said light source for screening a part of light emitted by said light source and producing a bright-dark limit of a light beam exiting the headlight, said screening device having at least one light impermeable web arranged at each side of an optical axis and extending along the optical axis of said reflector and also extending over a part of a periphery of said light source, said webs having upper edges and lower edges, said upper edges of said webs being arranged so that an opening is provided between said upper edges of said webs so that the light emitted by said light source and reflected by an upper region of said reflector forms a light beam having said bright-dark limit, said screening device also having a light-impermeable cap which is arranged additionally to said webs underneath said light source and extends over part of the periphery of said light source, said cap having upper edges arranged so that an additional opening is provided between each of said upper edges of said cap and said lower edges of said webs so that the light is formed by said light source can pass through said additional opening and is reflected by a lower region of said reflector so as to form an additional light beam extending at a distance above said bright-dark limit.

2. A headlight as defined in claim 1, wherein said additional opening through which the light emitted by said light source passes for forming said additional light beam is gap-like and formed so that an extension of said additional opening along said optical axis is greater than an extension of said additional opening in a peripheral direction of said headlight source.

3. A headlight as defined in claim 1, wherein said additional opening in a peripheral direction of said light source has an extension which is substantially constant over a longitudinal extension of said further opening along said optical axis.

4. A headlight as defined in claim 1, wherein said extension of said additional opening over the periphery of said light source is changeable over its longitudinal extension along said optical axis so that the light passing through said additional opening after being reflected from said reflector forms said additional light beam which has a substantially constant height over its extension in a horizontal direction.

5. A headlight as defined in claim 1, wherein said webs are formed as separate components arranged outside of said light source.

6. A headlight as defined in claim 1, wherein said cap is formed as a separate component arranged outside of said light source.

* * * * *